US012037180B2

(12) United States Patent
Watanabe

(10) Patent No.: US 12,037,180 B2
(45) Date of Patent: Jul. 16, 2024

(54) PACKAGING CONTAINER

(71) Applicant: GC Corporation, Shizuoka (JP)

(72) Inventor: Kaori Watanabe, Tokyo (JP)

(73) Assignee: GC Corporation, Shizuoka (JP)

( * ) Notice: Subject to any disclaimer, the term of this patent is extended or adjusted under 35 U.S.C. 154(b) by 359 days.

(21) Appl. No.: 17/596,955

(22) PCT Filed: Jun. 5, 2020

(86) PCT No.: PCT/JP2020/022444
§ 371 (c)(1),
(2) Date: Dec. 22, 2021

(87) PCT Pub. No.: WO2020/261948
PCT Pub. Date: Dec. 30, 2020

(65) Prior Publication Data

US 2022/0227563 A1 Jul. 21, 2022

(30) Foreign Application Priority Data

Jun. 28, 2019 (JP) ................................ 2019-122171

(51) Int. Cl.
*B65D 81/26* (2006.01)
*A61J 1/00* (2023.01)

(52) U.S. Cl.
CPC .............. *B65D 81/265* (2013.01); *A61J 1/00* (2013.01); *B65D 81/266* (2013.01)

(58) Field of Classification Search
CPC ............................ B65D 81/265; B65D 81/266
See application file for complete search history.

(56) References Cited

U.S. PATENT DOCUMENTS 4,653,685 A 3/1987 Leary et al.

FOREIGN PATENT DOCUMENTS

| | | | |
|---|---|---|---|
| DE | 3723406 A1 * | 7/1987 | ............. A63B 47/00 |
| DE | 3723406 | 1/1989 | |
| FR | 2720054 | 11/1995 | |
| JP | H04-136483 U | 12/1992 | |
| JP | H09156671 A * | 12/1995 | ............. A45C 11/20 |
| JP | H08-230952 | 9/1996 | |
| JP | 2004-016395 | 1/2004 | |
| JP | 2012-046225 | 3/2012 | |
| WO | 2005/016763 | 2/2005 | |

OTHER PUBLICATIONS

International Search Report for PCT/JP2020/022444 mailed on Aug. 18, 2020.

* cited by examiner

*Primary Examiner* — Anthony D Stashick
*Assistant Examiner* — L Kmet
(74) *Attorney, Agent, or Firm* — IPUSA, PLLC

(57) ABSTRACT

A packaging container includes a body part, a lid part integrally engaged with the body part, an inner lid positioned between the body part and the lid part, a stored item containing part opening from an engaged portion of the lid part that is engaged with the body part, and configured to contain a stored item, a chemical agent containing part opening from the engaged portion of the lid part that is engaged with the body part, the chemical agent containing part being formed separately from the stored item containing part, and a ventilation path in which the stored item containing part and the chemical agent containing part are in communication, the ventilation path being formed in an inner space defined by the first member and the second member.

7 Claims, 7 Drawing Sheets

PACKAGING CONTAINER

TECHNICAL FIELD

The present invention relates to a packaging container.

BACKGROUND ART

In the field of medical devices and foodstuffs, packaging containers containing chemical agents such as oxygen absorbent and desiccant are used to store a product (stored item) that require sterility and dryness. In such a packaging container, for example, a containing space and a chemical agent containing space are separated by an inner lid or a diaphragm, and the stored item and the chemical agent are stored in the container (see, for example, Patent Document 1).

PRIOR ART DOCUMENTS

Patent Documents

Patent Document 1: Japanese Patent Application Laid-Open No. 8-230952

SUMMARY OF THE INVENTION

Problem to be Solved by the Invention

However, in conventional packaging containers, the storage conditions of the stored item may deteriorate because the chemical agent requires a certain period of time to have an effect on the stored item, for example, as in the case where the stored item after removing oxygen, is oxidized by contact with oxygen.

The present disclosure is intended to provide a packaging container capable of quickly having an effect of a chemical agent on a stored item.

Means for Solving the Problem

One embodiment of the present invention is intended to provide a packaging container that includes a first member; a second member configured to engage with the first member integrally, an inner lid disposed between the first member and the second member; a stored item containing part opening from an engaged portion of the first member that is engaged with the second member, and configured to contain a stored item; a chemical agent containing part opening from the engaged portion of the second member that is engaged with the first member, the chemical agent containing part being formed separately from the stored item containing part, and configured to contain a chemical agent; and a ventilation path in which the stored item containing part and the chemical agent containing part are in communication, the ventilation path being formed in an inner space defined by the first member and the second member.

Effect of the Invention

According to the present disclosure, a packaging container can be provided capable of quickly having an effect of a chemical agent on a stored item.

EMBODIMENTS FOR IMPLEMENTING THE INVENTION

Figure 1:
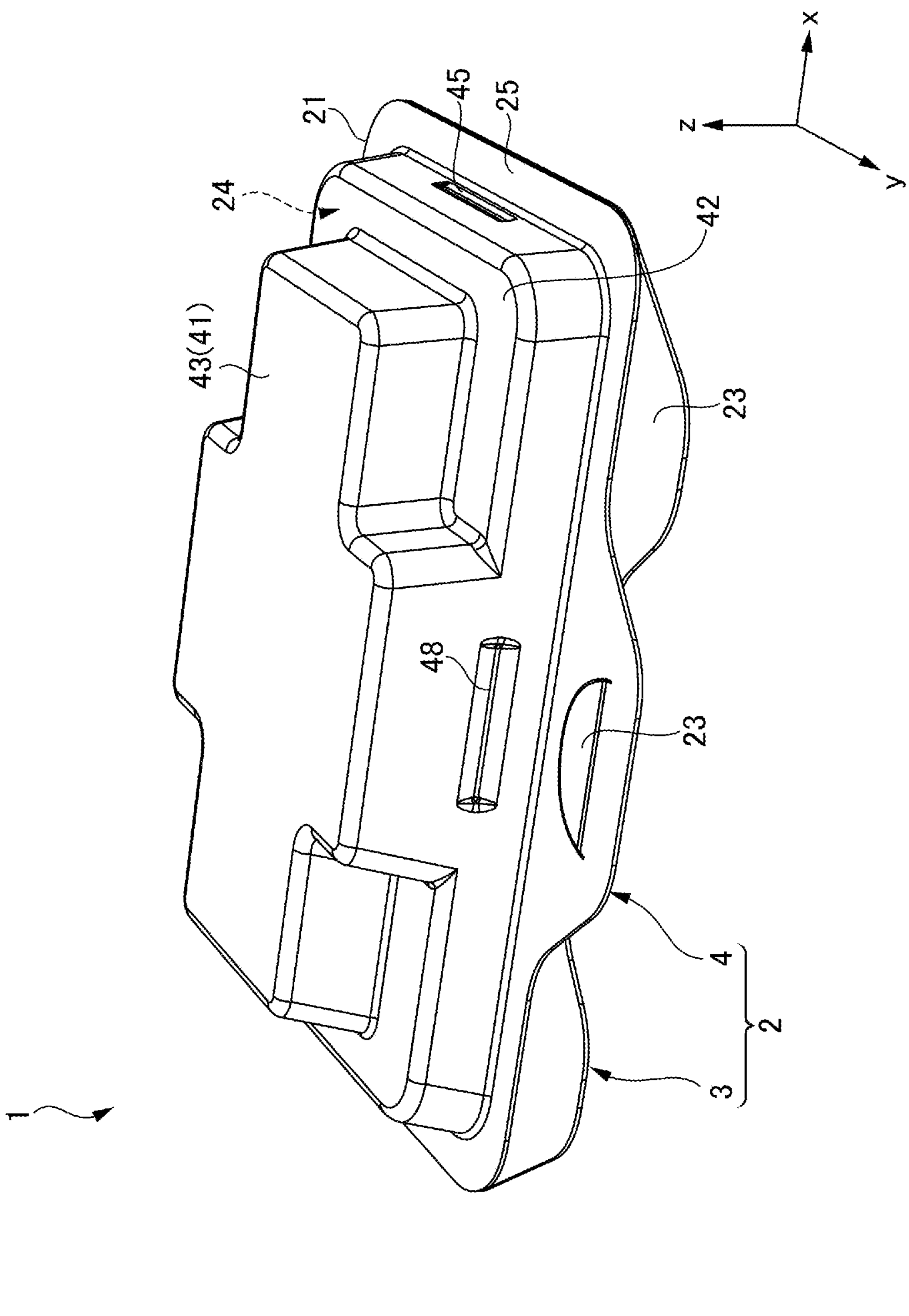
FIG. 1 is an assembly perspective view of a packaging container according to an embodiment.

Hereinafter, embodiments will be described with reference to the accompanying drawings. In order to facilitate the understanding of the description, the same elements in each drawing are, as far as possible, designated by the same reference numerals, and the overlapping description is omitted.

In the following description, an x direction, a y direction, and a z direction are perpendicular to each other. The x direction and the y direction are typically horizontal directions, and the z direction is typically a vertical direction. The x direction is an extending direction of a long side of a packaging container 1. The y direction is an extending direction of a short side of the packaging container 1. For the sake of convenience, a z-positive side may be referred to as an upper side, and a z-negative side may be referred to as a lower side.

Figure 2:
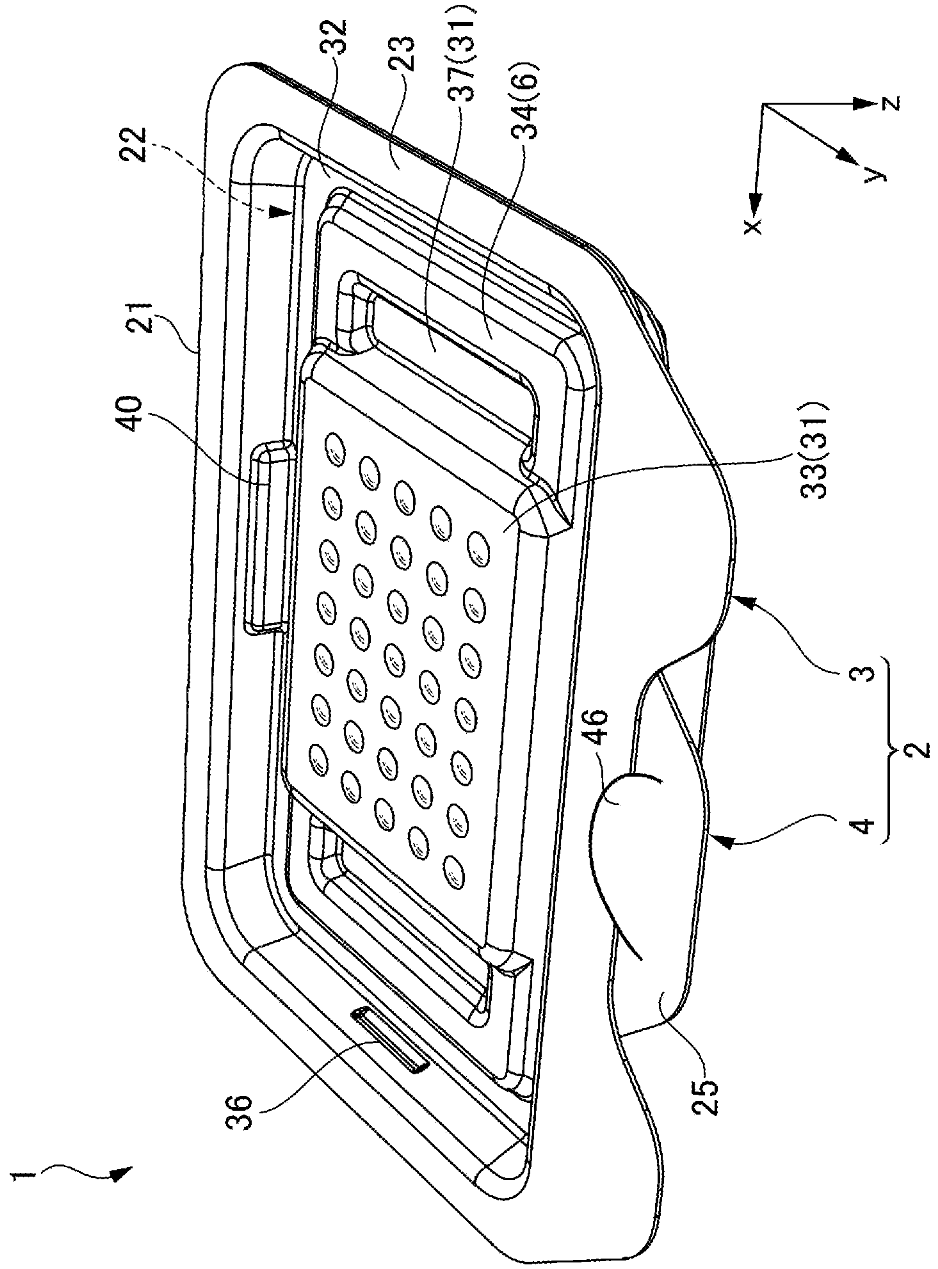
FIG. 2 is an assembly perspective view of the packaging container shown in FIG. 1 as seen from below.
Figure 3:
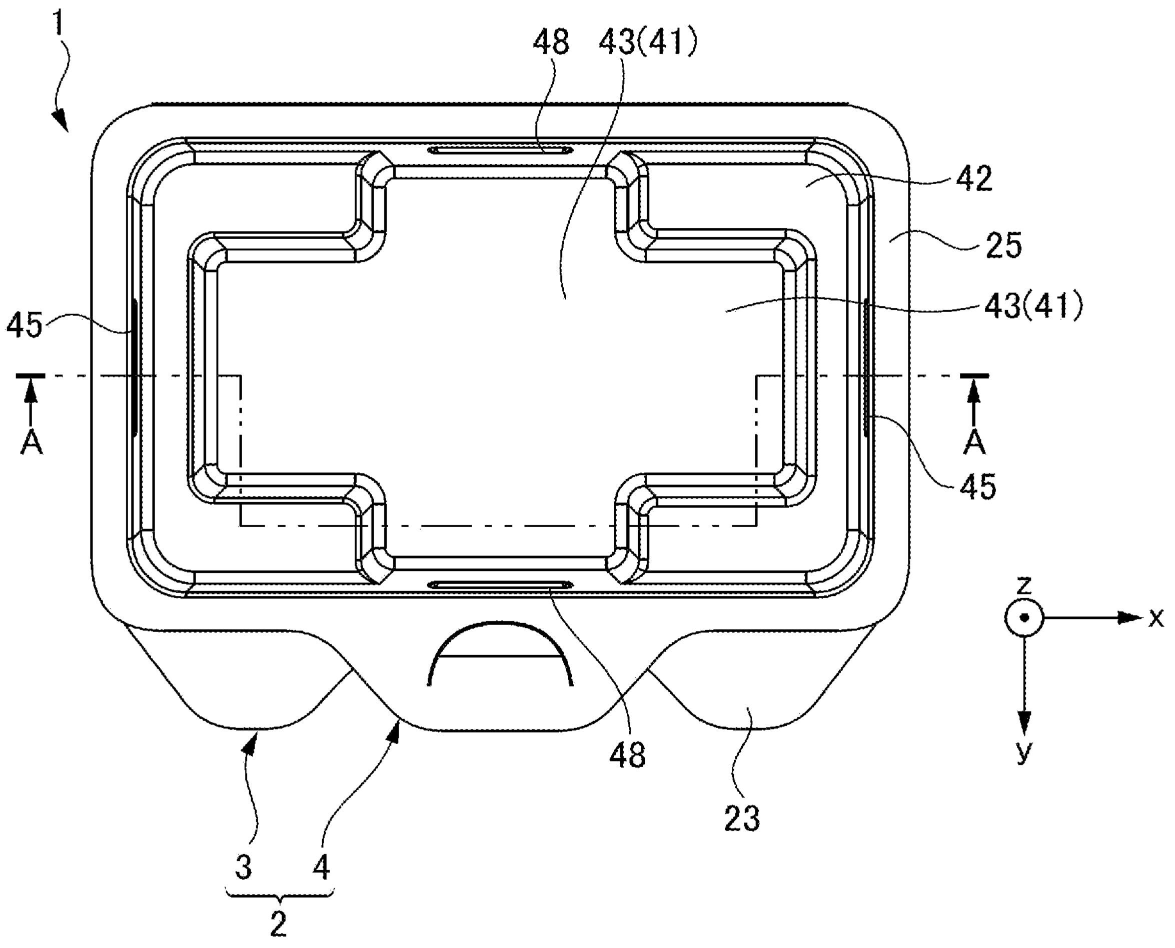
FIG. 3 is a plan view of the packaging container shown in FIG. 1 as seen from above.
Figure 4:
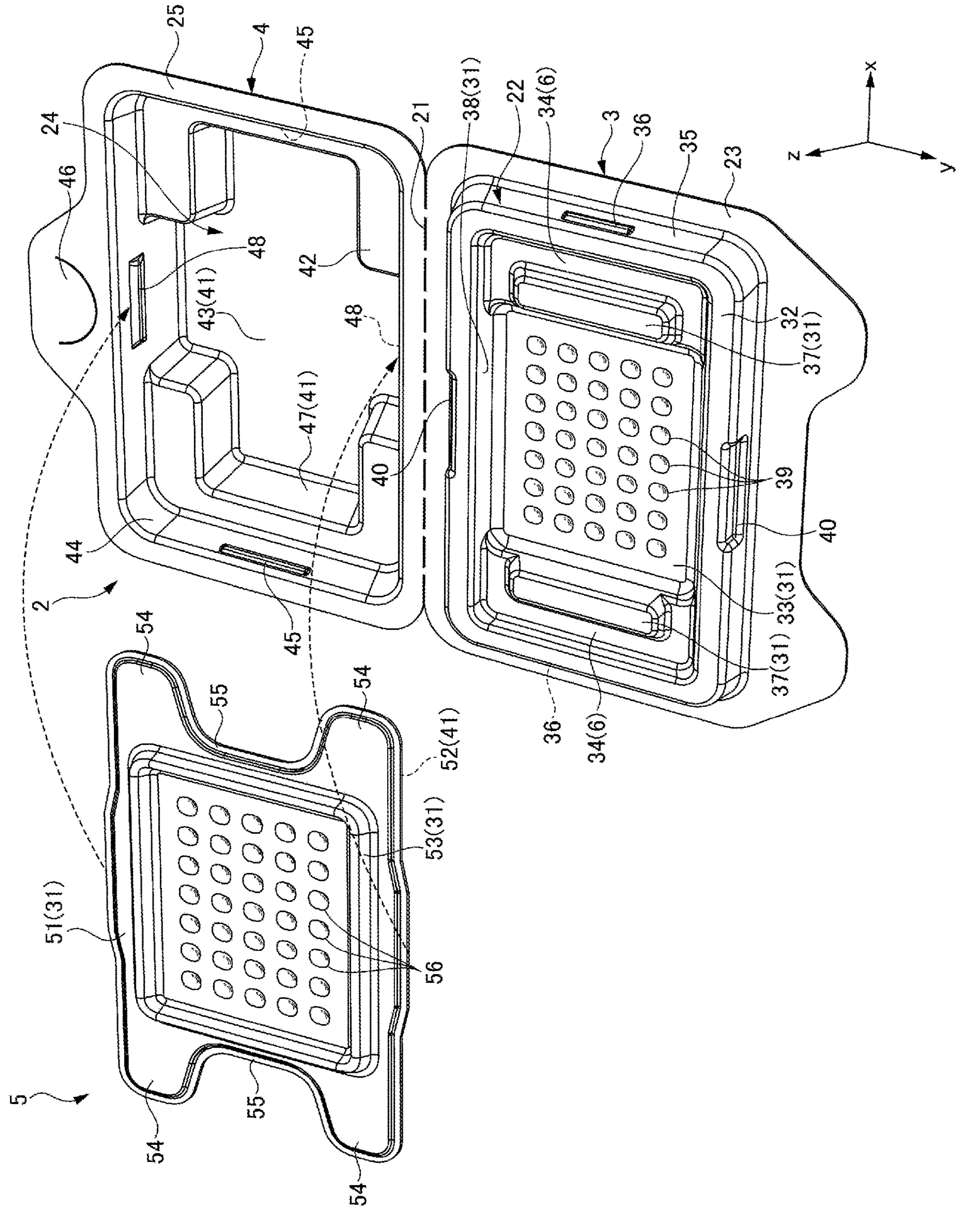
FIG. 4 is an exploded perspective view of the packaging container shown in FIG. 1.
Figure 5:
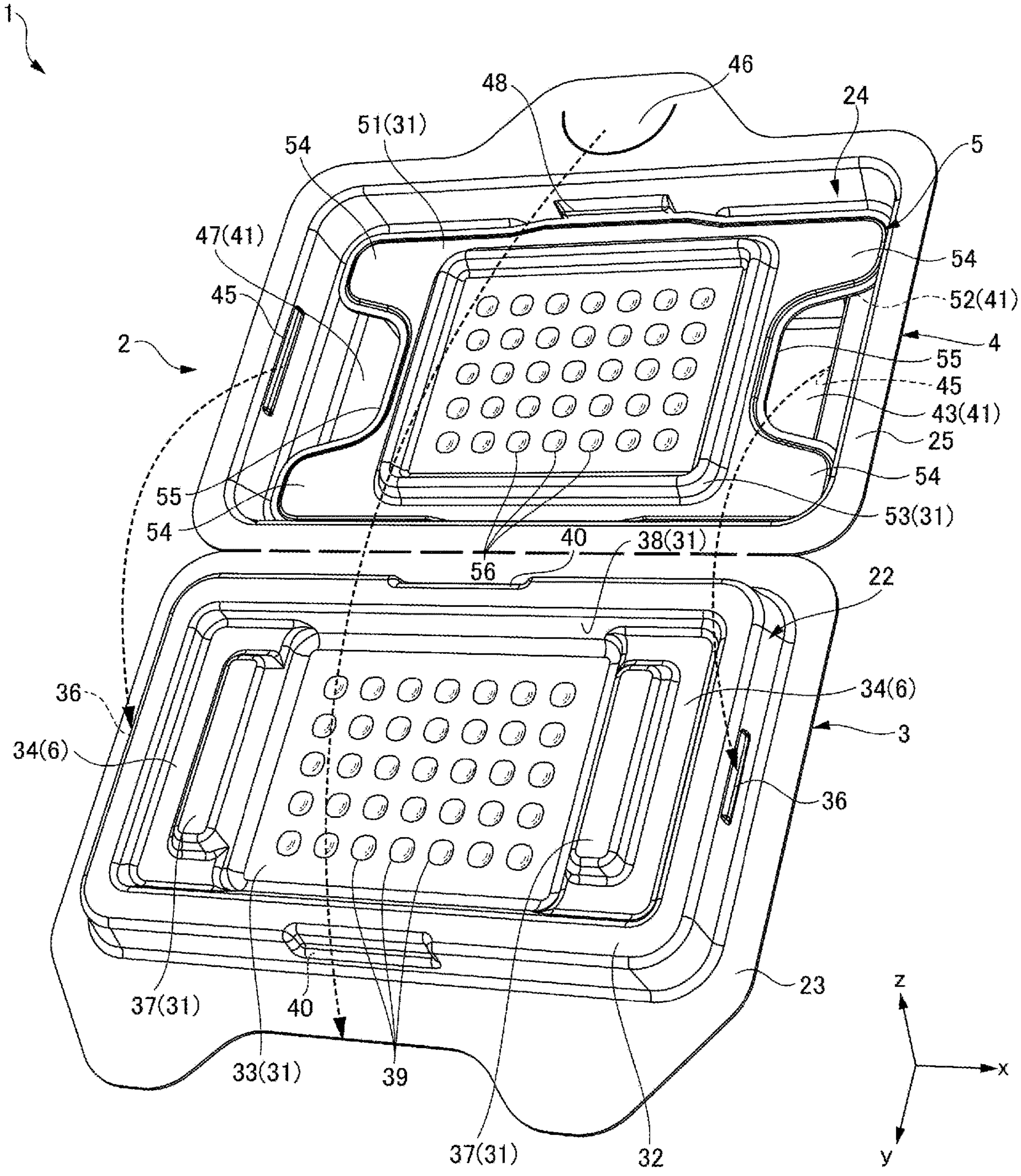
FIG. 5 is a perspective view of an inner lid engaging with a main body in a state of a lid being removed.
Figure 6:
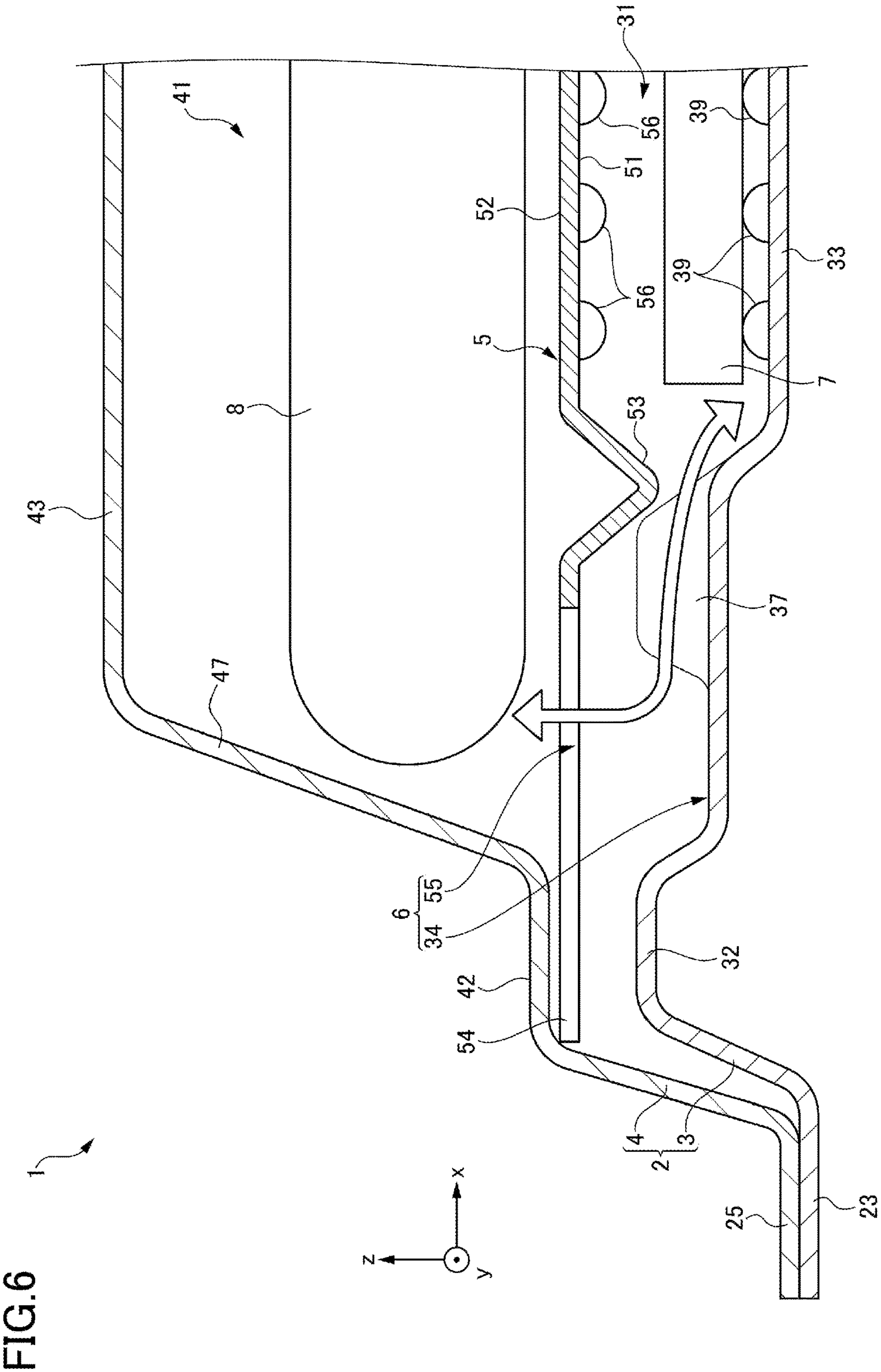
FIG. 6 is a cross-sectional view showing a ventilation path of ventilation along an A-A line in FIG. 3.
Figure 7:
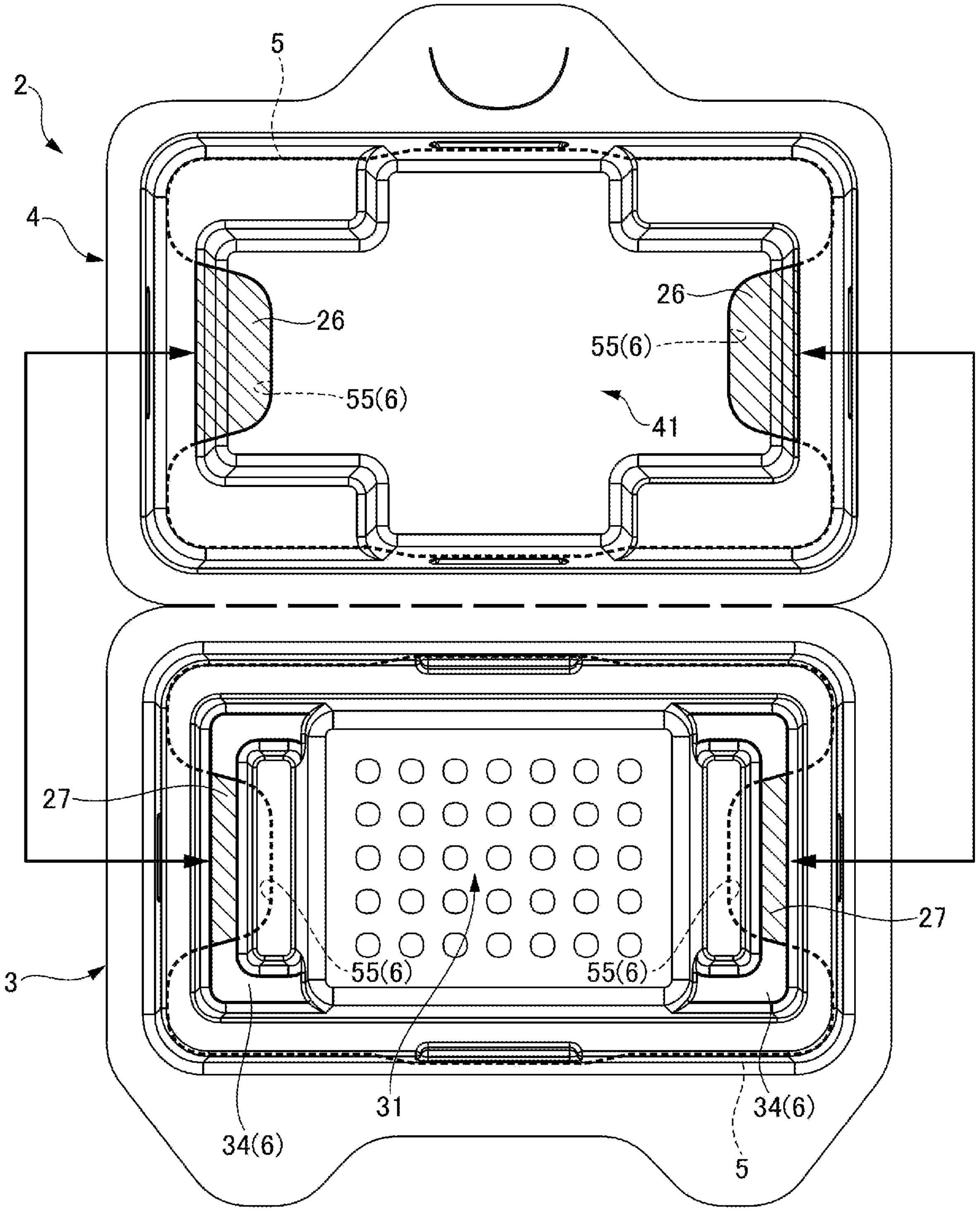
FIG. 7 is a superimposed diagram showing a main body in an open state and an inner lid, and showing a ventilation path.

FIG. 1 is an assembly perspective view of a packaging container 1 according to an embodiment. FIG. 2 is an assembly perspective view showing the packaging container 1 shown in FIG. 1 as seen from below. FIG. 3 is a plan view of the packaging container 1 shown in FIG. 1 as seen from above. FIG. 4 is an exploded perspective view of the packaging container 1 shown in FIG. 1. FIG. 5 is a perspective view illustrating a state of an inner lid 5 engaging with a main body 2 in an open state. FIG. 6 is a cross-sectional view along an A-A line in FIG. 3, and shows a ventilation path 6. FIG. 7 is a superimposed diagram showing a main body 2 in an open state and the inner lid 5, and is a diagram showing a ventilation path 6.

The packaging container 1 shown in FIGS. 1 to 3 is a container that can contain a stored item 7 and a chemical agent 8 separately from each other so that the stored item 7 and the chemical agent 8 do not come into direct contact with each other, as shown in FIG. 6.

The stored item 7 includes, for example, an absorbing membrane for tissue regeneration for oral surgery. The absorbing membrane for tissue regeneration, for example, is positioned between an artificial bone and soft tissue such as gums when implanting the artificial bone in a jaw during oral surgery, and is used to prevent adhesion between the artificial bone and the soft tissue. The absorbing membrane for tissue regeneration has properties that decompose by oxygen and water. Because the absorbing membrane decomposes and is absorbed in the body after a certain period of time after surgery, there is no need to perform surgery again to remove the absorbing membrane from the body. When the absorbing membrane for tissue regeneration is compressed or deformed by external forces, the above properties are liable to deteriorate.

The packaging container 1 is a container for holding the stored item 7 so as to prevent the stored item 7 from being subjected to external forces. As shown in FIGS. 1 and 3, the packaging container 1 has a configuration in which an upper portion protrudes in a substantially cross shape, thereby increasing the strength against external forces from the upper portion. Further, as shown in FIG. 2, by forming the bottom face as a raised bottom, the stored item 7 is configured not to directly receive external forces from below.

For example, the absorbing membrane for tissue regeneration as the stored item 7 is formed in three kinds of rectangular shapes: 15×25 mm, 25×25 mm, and 30×40 mm, and one of the principal faces may be an adhesive face.

Further, because the absorbing membrane for tissue regeneration as the stored item 7 has decomposing properties by contacting with oxygen and moisture as described above, it is necessary to remove oxygen and moisture from the surroundings of the stored item 7 when the stored item 7 is placed in the packaging container 1. For this purpose, a chemical agent 8 having the deoxygenating and/or dehydrating properties and capable of absorbing ambient oxygen and/or water is contained within the packaging container 1.

By housing the stored item 7 and the chemical agent 8 within the packaging container 1, the chemical agent 8 adsorbs oxygen and/or moisture around the stored item 7 so that the quality of the stored item 7 can be maintained. In addition, the packaging container 1 is preferably sealed in an aluminum bag while the stored item 7 and the chemical agent 8 are contained in the packaging container 1. Thus, it is possible to prevent oxygen and/or moisture from entering from the outside, for example, from the aluminum bag, and the quality of the stored item 7 can be reliably maintained. Here, when sealing the aluminum bag or the like, the inside of the aluminum bag or the like is preferably degassed to a vacuum, and then filled with an inert gas such as nitrogen.

As shown in FIGS. 4 and 5, the packaging container 1 includes the main body 2 and the inner lid 5. As shown in FIGS. 1 to 6, the main body 2 has a body part 3 (a first member) and a lid part 4 (a second member). The material of the packaging container 1 is, for example, a PET (polyethylene terephthalate) resin, which is transparent in this case, but each of the figures is shown as a non-transparent object for ease of viewing the shape.

As shown in FIGS. 4 and 5, the body part 3 and the lid part 4 of the main body 2 are formed in an approximately rectangular shape in a planar view and are integrally formed by connecting one long side of the body part 3 with one long side of the lid part 4 via a boundary portion 21. The body part 3 has a protruding part 22 protruding toward a side facing the lid part 4 and a lower first plane part 23 having a rectangular frame shape formed along an outer edge of the protruding part 22.

The lid part 4 has a depression 24 formed by bending downward from a side facing the body part 3 and an upper first plane part 25 having a rectangular frame shape famed along an outer edge of the depression 24.

By bending the boundary portion 21 along the long side of the body part 3 and the lid part 4, the depression 24 is engaged with the protruding part 22 of the body part 3, and the upper first plane part 25 and the lower first plane part 23 contact with each other. As a result, the packaging container 1 is assembled and a storage space is famed therein.

The protruding part 22 of the body part 3 has a lower second plane part 32 and a lower third plane part 33. The lower second plane part 32 protrudes in a step-like manner along the inside of the lower first plane part 23 and is formed in a rectangular frame shape. The lower third plane part 33 is a rectangular plane disposed inside the lower second plane part 32 at a position between the lower first plane part 23 and the lower second plane part 32 in the z direction. The lower third plane part 33 forms a part of a stored item containing part 31.

Further, grooves 34 forming part of the ventilation path 6 are disposed on both sides of the lower third plane part 33 in the x direction. The details of the ventilation path 6 will be described later. The grooves 34 are formed while being bent toward the negative z-direction from the face of the lower second plane part 32, and the bottom faces of the grooves 34 are located on the z-positive side of the lower third plane part 33. The groove 34 is approximately C-shaped, and both ends thereof are connected to the stored item containing part 31 at both ends of the rectangular short side of the lower third plane part 33. Between the grooves 34 and the lower third plane part 33, intermediate wall parts 37 are formed at the same height as that of the lower second plane part 32. The intermediate wall parts 37 extend along the short sides of the rectangular shape of the lower third plane part 33.

The long side portion of the lower third plane part 33 is defined by an inner peripheral surface 38 between the lower second plane part 32 and the lower third plane part 33, and the short side portion is defined by the intermediate wall part 37 to form the lower portion of the stored item containing part 31. A convex pattern 39 constituted of a plurality of hemispherical projections is formed on the surface of the lower third plane part 33.

The depression 24 of the lid part 4 has an upper second plane part 42 and an upper third plane part 43. The upper second plane part 42 is famed in a step-like manner as a depression along the inside of the upper first plane part 25. The upper third plane part 43 is formed in a step-like manner as a depression relative to the upper second plane part 42. The upper third plane part 43 is an approximate cross-shaped plane extending in the x and y directions in a plane view. The upper third plane part 43 forms a part of a chemical agent containing part 41.

As shown in FIGS. 2, 4, and 5, an outer peripheral surface 35 between the lower first plane part 23 and the lower second plane part 32 of the body part 3 includes body-side locking parts 36 to engage with the lid part 4. Further, as shown in FIGS. 1, 3, 4, and 5, an inner peripheral surface 44 between the upper first plane part 25 and the upper second plane part 42 of the lid part 4 includes lid-side locking parts 45 to engage with the body part 3. In the present embodiment, a pair of the body-side locking parts 36 is provided on a pair of short sides of a rectangular shape in a plan view of the outer peripheral surface 35. A pair of the lid-side locking parts 45 is provided at positions facing each other when the body part 3 and the lid part 4 engage with each other, of the pair of short sides of the rectangular shape in a plan view of the inner peripheral surface 44. Both the body-side locking part 36 and the lid-side locking part 45 are linear projections formed along the extending direction of the short sides.

The distance between the lid-side locking part 45 and the upper first plane part 25 is less than the distance between the body-side locking part 36 and the lower first plane part 23. This configuration allows the lid-side locking part 45 to advance beyond the body-side locking part 36 and to be positioned between the body-side locking part 36 and the lower first plane part 23 during assembly. Thus, the movement of the lid part 4 of the lid-side locking part 45 toward the open side (the z-positive side of FIG. 4 and FIG. 5 and the lower second plane part 32 side) is regulated by the body-side locking part 36. As a result, the body part 3 and the lid part 4 are engaged with each other.

Further, as shown in FIGS. 2, 4, and 5, a stop 46 for engagement is provided at a center of one of the pair of long sides of the upper first plane part 25 of the lid part 4 on the side without the boundary portion 21 between the body part 3 and the lid part 4. The stop 46 is provided, for example, with a substantially semi-circular cut in a portion of the upper first plane part 25. This cut is formed so that an arc projects toward the center of the container 1, and the outer edge of the lower first plane part 23 of the body part 3 is inserted into the cut, as shown in FIGS. 1 and 2, and the body part 3 and the lid part 4 are firmly secured.

As shown in FIGS. 4 to 6, when the packaging container 1 is assembled, the inner lid 5 is disposed so that a first principal face 51 faces the lower second plane part 32 of the body part 3 and that a second principal face 52 faces the upper second plane part 42 of the lid part 4. A frame projection 53 is erected at a position facing the lower third plane part 33 of the first principal face 51. The frame projection 53 is formed in an approximately rectangular shape along the outline of the lower third plane part 33. The long side portion of the frame projection 53 contacts the inner peripheral surface 38 of the lower second plane part 32, thereby regulating a movement of the inner lid 5 in the y-direction, and the short side portion of the frame projection 53 contacts the intermediate wall part 37, thereby regulating a movement of the inner lid 5 in the x-direction.

A convex pattern 56 of a plurality of hemispherical protrusions is famed inside the frame projection 53 of the first principal face 51. When the packaging container 1 is assembled, the frame projection 53 of the inner lid 5 is engaged with the inner peripheral surface 38 of the lower second plane part 32 and the inside of the pair of intermediate wall parts 37. At this time, the stored item containing part 31 is formed by the lower third plane part 33, the first principal face 51 of the inner lid 5, the pair of intermediate wall parts 37, and the inner peripheral surface 38 of the lower second plane part 32.

An ear part 54 is provided on both sides of the frame projection 53 of the inner lid 5 in the x-direction, and a recess 55 curved toward the frame projection 53 is provided at the center of the ear part 54 in the y-direction.

As shown in FIGS. 1 and 3 to 5, a pair of locking parts 48 to engage with the inner lid 5 is provided at the center of the pair of rectangular long sides of the inner peripheral surface 44 of the lid part 4. The locking parts 48 are linear protrusions formed along the extending direction of the long sides.

As shown in FIGS. 4 and 5, when the container is assembled, the inner lid 5 is inserted into the depression 24 of the lid part 4, and both ends of the long side of the inner lid 5 are moved beyond the locking part 48, and are disposed between the locking part 48 and the upper second plane part 42. As a result, the movement of the longitudinal ends of the inner lid 5 to the spaced-apart side (the z-positive side of FIG. 4 and FIG. 5 and the upper first plane part 25 side) is regulated by the locking part 48. As a result, the inner lid 5 is engaged with the depression 24 of the lid part 4. At this time, a chemical agent containing part 41 is famed by an inner peripheral surface 47, the upper third plane part 43 of the lid part 4, the second principal face 52 of the inner lid 5, and the inner peripheral surface 47 between the upper second plane part 42 and the upper third plane part 43.

Further, as shown in FIGS. 2, 4, and 5, a pair of containing grooves 40 is provided at the center of a pair of long sides of a rectangular shape in a plan view, of the outer peripheral surface 35 between the lower first plane part 23 and the lower plane portion 32 of the body part 3. The containing groove 40 is formed so that the outer peripheral surface 35 curves inward along the z-negative direction from the lower second plane part 32. The containing groove 40 is provided in a position facing the locking part 48 of the lid part 4. Accordingly, when the body part 3 engages with the lid part 4, because the locking part 48 enters the containing groove 40, the locking part 48 smoothly engages with the body part 3 without causing the lid part 4 to interfere with the engagement.

As shown in FIG. 6, the protrusion amount from the first principal face 51 of the frame projection 53 of the inner lid 5 is formed so that a communication portion between a groove 34 of the body part 3 and the stored item containing part 31 is not blocked when the container is assembled, and that a gap is formed between the groove 34 and the frame projection 53. This ensures communication between the groove 34 and the stored item containing part 31.

In addition, as shown in FIG. 7, even when the inner lid 5 engages with the lid part 4 by the recesses 55 at both ends of the inner lid 5 in the x-direction, the inner lid 5 does not completely block the chemical agent containing part 41 and forms an opening 26 (shaded portion in FIG. 7) at parts of both ends in the x-direction. Similarly, even when the inner lid 5 engages with the body part 3, the inner lid 5 does not completely block the pair of grooves 34 on both sides of the stored item containing part 31 in the x-direction, and forms an opening 27 (shaded portion of FIG. 7) at the center of the groove 34 in the y-direction. The openings 26 and the openings 27 are at least partially superimposed while facing each other during container assembly. That is, as shown in FIGS. 6 and 7, the ventilation paths 6 for communicating the stored item containing part 31 to the chemical agent containing part 41 are formed inside the main body 2 by the grooves 34 of the body part 3 and the recesses 55 of the inner lid 5.

Next, the effect of the packaging container 1 according to the present embodiment will be described. The packaging container 1 according to the present embodiment includes the body part 3, the lid part 4 integrally engaged with the body part 3, the inner lid 5 disposed between the body part 3 and the lid part 4, the stored item containing part 31 opening from an engaged portion of the body part 3 that is engaged with the lid part 4 and that houses a sheet-shaped stored item 7, the chemical agent containing part 41 opening from the engaged portion of the lid part 4 that is engaged with the body part 3, which is formed separately from the stored item containing part 31, and contains a deoxidizing and/or dehydrating chemical agent 8, and ventilation paths 6 that are famed in an inner space defined by the body part 3 and the lid part 4 and in which communicate the stored item containing part 31 and the chemical agent containing part 41 are in communication.

With this configuration, because the stored item 7 and the chemical agent 8 can be housed into the container while being separated from each other, and because communication between the stored item containing part 31 and the chemical agent containing part 41 can be ensured through the ventilation path 6, the absorption of oxygen and/or water within the stored item containing part 31 by the chemical agent 8 can be promoted, and the effect of the chemical agent 8 can be quickly applied to the stored item 7. Further, because the stored item 7 does not contact the chemical agent 8, the deterioration or functional deterioration of the stored item 7 due to contact with the chemical agent 8 can be prevented, and the quality of the stored item 7 can be reliably maintained.

Further, in the packaging container 1 according to the present embodiment, because the ventilation paths 6 are formed on both sides of the stored item containing part 31 in the x-direction, the thickness of the container in the z-direction can be prevented, and space can be saved.

The packaging container 1 according to the present embodiment includes grooves 34 including ends in a circumferential direction on both sides of a single face of an inner wall of the stored item containing part 31 and formed into approximately C shapes connecting both ends, and disposed at a position where at least part of the grooves 34 face the chemical agent containing part 41 when the body part 3 and the lid part 4 engage with each other, ear parts 54 formed extending laterally from the inner lid 5 and disposed facing the grooves 34 when the body part 3 and the lid part 4 are engaged with each other, and recesses 55 formed so as to curve inward from the ends of the ear parts 54 to the center side of the inner lid 5 and disposed between parts of the grooves 34 and the chemical agent containing part 41 when the body part 3 and the lid part 4 are engaged with each other, and the grooves 34 and recesses 55 form ventilation paths 6.

In this configuration, because the ventilation path 6 is formed by combining parts of the body part 3 and the inner lid 5 without a dedicated ventilation path 6, the ventilation path 6 can be secured while ensuring the ease of assembly of the container. Further, the grooves 34 are formed in a substantially C shape, and particularly in the present embodiment, both ends of the groove 34 are connected to the stored item containing part 31 at both ends of the short side of rectangular sides of the lower third plane part 33, and the intermediate wall part 37 is disposed at the center of the short side. Therefore, the opening portion of the ventilation path 6 to the stored item containing part 31 can be limited to both ends of the inner wall of the stored item containing part 31 (both ends of the intermediate wall part 37 in the y-direction). As a result, because the rectangular corner of the sheet-shaped stored item 7 in the stored item containing part 31 is unlikely to enter the ventilation path 6, it is possible to prevent deformation caused by the entrance of the stored item 7 into the ventilation path 6 and prevent deformation and functional deterioration due to defamation of the stored item 7.

In the packaging container 1 of the present embodiment, the inner lid 5 includes the frame projection 53 that engages with the outer edge of the stored item containing part 31, on the first principal face 51 facing the body part 3 when disposed between the body part 3 and the lid part 4. This configuration can prevent the stored item 7 from sticking out from the stored item containing part 31 to the inner lid 5 side. Further, it is possible to inhibit the movement of the inner lid 5 in the x direction and the y direction relative to the body part 3, and thus it is possible to inhibit the generation of vibration and noise.

Further, in the packaging container 1 according to the present embodiment, the bottom face (the bottom third plane part 33) of the stored item containing part 31 is parallel to the bottom face (the bottom first plane part 23) of the body part 3 and is formed closer to the engaged portion than the bottom face of the body part 3. Because the stored item containing part 31 has a raised bottom due to this configuration, the stored item 7 within the stored item containing part 31 is not directly subjected to external forces from below, thereby ensuring that the stored item containing part 7 is held more reliably.

Further, in the packaging container 1 according to the present embodiment, the convex pattern 39 protruding from the engaged portion side and supporting the stored item 7 is provided on the bottom face of the stored item containing part 31. This configuration can reduce a contact area of the stored item 7 within the stored item containing part 31, prevent adhesion of the stored item 7, and improve the ease of removal.

In the packaging container 1 according to the present embodiment, the inner lid 5 is detachably engaged with the lid 4. As a result, because the bottom side of the stored item containing part 31 is exposed when the lid part 4 is opened or closed, the stored item 7 can be easily carried in and out.

Further, in the packaging container 1 according to the present embodiment, the body part 3 and the lid part 4 are formed as a single member, and are engaged with each other by folding the boundary portion 21. This configuration can reduce the number of parts and manufacturing costs and can facilitate the assembly.

As described above, the present embodiment has been described with reference to the specific examples. However, the present disclosure is not limited to these embodiments. With respect to these design modifications applied as appropriate by those skilled in the art are also encompassed by the present disclosure as long as they possess the features of the present disclosure. The elements provided in each of the embodiments described above, and the arrangement, conditions, shape, and the like thereof, may be adapted and modified as appropriate without being limited to those exemplified. Each element provided by each of the above-described embodiments may vary in combination as appropriate, unless there is a technical inconsistency.

In the above-described embodiment, the body part 3 and the lid part 4 are famed integrally. However, the body part 3 and the lid part 4 may be separate members. Meanwhile, in the above-described embodiment, the main body 2 having the body part 3, the lid part 4, and the inner lid 5 are configured as separate members. However, the main body 2 and the inner lid 5 may be configured to be integrally formed. In this case, the inner lid 5 is connected to one side, for example, of the long side of the body part 3 or the lid part 4, which is not the boundary portion 21.

In the above-described embodiment, the stored item containing part 31 is provided in the body part 3, and the chemical agent containing part 41 is provided in the lid part 4. However, in contrast to the above-described configuration, the stored item containing part 31 is provided in the lid part 4 and the chemical agent containing part 41 is provided in the body part 3.

In the above-described embodiment, the sheet-shaped stored item 7 is exemplified, but the shape of the stored item 7 may be other than the sheet shape. Further, in the above-described embodiment, the deoxygenating and/or dehydrating chemical agent 8 is exemplified. However, the function of the chemical agent 8 may be other than deoxygenating and dehydrating.

The present international application claims priority to Japanese Patent Application No. 2019-122171, filed Jun. 28, 2019, the entire contents of which are hereby incorporated by reference herein.

DESCRIPTION OF SYMBOLS

- 1 packaging container
- 2 main body
- 3 body part (first member)
  - 31 stored item containing part
  - 33 lower third plane part (bottom face of stored item containing part)

34 groove
39 convex pattern
4 lid part (second member)
41 chemical agent containing part
5 inner lid
51 first principal face
52 second principal face
53 frame projection
54 ear part
55 recess
6 ventilation path
7 stored item
8 chemical agent

The invention claimed is:

1. A packaging container, comprising:

a first member;

a second member configured to engage with the first member integrally, thereby forming an enclosure between the first member and the second member;

an inner lid disposed between the first member and the second member;

wherein the enclosure includes:

an item container configured to store an item in part of the enclosure;

a chemical agent container configured to contain a chemical agent in part of the enclosure, both the item container and the chemical agent container having openings at an engaged portion between the first member and the second member, and the item container and the chemical agent container being separated by the inner lid; and a ventilation path in which the item container and the chemical agent container are in communication, the ventilation path being formed in the enclosure;

wherein the packaging container further comprises:

a groove including ends on both sides in a circumferential direction of a single face of an inner wall of the item container, formed in an approximately C shape connecting the ends, and disposed at a position at least partially facing the chemical agent container when engaging the first member with the second member;

an ear part formed laterally extending from the inner lid and disposed facing the groove when the first member is engaged with the second member; and a recess formed curving inward to a central side of the inner lid from an end of the ear part, and disposed between a part of the groove and the chemical agent container when the first member is engaged with the second member, wherein the groove and the recess form the ventilation path.

2. The packaging container as claimed in claim 1, wherein the inner lid includes a frame-shaped projection engaging with an outer edge of the item container on a principal face facing the first member when the inner lid is disposed between the first member and the second member.

3. The packaging container as claimed in claim 1, wherein the item container has a central bottom face located on a central side of the first member and an end bottom face located at an end of the first member, and the central bottom face is formed parallel to and positioned closer to the engaged portion than the end bottom face.

4. The packaging container as claimed in claim 1, wherein a bottom face of the item container includes a convex pattern formed projecting toward the engaged portion and configured to support the item.

5. The packaging container as claimed in claim 1, wherein the inner lid is engaged with the second member detachably.

6. The packaging container as claimed in claim 1, wherein the first member and the second member are formed as a single member, and are configured to engage with each other by folding a boundary portion.

7. The packaging container as claimed in claim 1, wherein the item is an absorbing membrane for tissue regeneration for oral surgery.

* * * * *